(12) United States Patent
Dumont et al.

(10) Patent No.: US 8,500,348 B2
(45) Date of Patent: Aug. 6, 2013

(54) KEYBOARD WITH ULTRA-DURABLE KEYS

(75) Inventors: Olivier Dumont, Suzhou (CN); Baptiste Merminod, Lausanne (CH); Alain Tabasso, Essertines (CH); Jean-Marc Flueckiger, Lausanne (CH); Patrick Monney, Mex (CH); Nicolas Chauvin, Chexbres (CH); Gerd Schneider, Mex (CH)

(73) Assignee: Logitech Europe S.A., Morges (CH)

( * ) Notice: Subject to any disclaimer, the term of this patent is extended or adjusted under 35 U.S.C. 154(b) by 420 days.

(21) Appl. No.: 12/621,349

(22) Filed: Nov. 18, 2009

(65) Prior Publication Data

US 2010/0187079 A1    Jul. 29, 2010

Related U.S. Application Data

(60) Provisional application No. 61/158,036, filed on Mar. 6, 2009, provisional application No. 61/117,297, filed on Nov. 24, 2008.

(51) Int. Cl.
*B41J 29/12* (2006.01)

(52) U.S. Cl.
USPC ........ 400/496; 400/490; 400/493; 200/302.1; 200/302.2

(58) Field of Classification Search
USPC ........................................... 400/496
See application file for complete search history.

(56) References Cited

U.S. PATENT DOCUMENTS

| | | | | |
|---|---|---|---|---|
| 1,530,146 | A * | 3/1925 | Sweeney | 400/493 |
| 2,584,841 | A * | 2/1952 | Caprez et al. | 40/629 |
| 3,890,480 | A * | 6/1975 | Berling et al. | 200/302.2 |
| 4,555,600 | A * | 11/1985 | Morse | 200/302.2 |
| 4,656,078 | A * | 4/1987 | Goto et al. | 400/490 |
| 5,300,742 | A * | 4/1994 | Huang | 200/302.2 |
| 5,612,692 | A * | 3/1997 | Dugas et al. | 200/5 B |
| 5,642,950 | A * | 7/1997 | Hochgesang et al. | 400/490 |
| 5,674,018 | A * | 10/1997 | Kaufman et al. | 400/490 |
| 5,697,718 | A * | 12/1997 | Erler et al. | 400/496 |
| 6,187,514 | B1 | 2/2001 | Kiyosawa et al. | |
| 6,196,738 | B1 * | 3/2001 | Shimizu et al. | 400/490 |
| 6,273,623 | B1 * | 8/2001 | Chao | 400/496 |
| 6,499,894 | B1 * | 12/2002 | Yu et al. | 400/490 |
| 6,967,056 | B2 * | 11/2005 | Kashino | 400/490 |

FOREIGN PATENT DOCUMENTS

| | | |
|---|---|---|
| CN | 1215218 A | 4/1999 |
| CN | 2368231 | 3/2000 |
| CN | 1595574 | 3/2005 |
| CN | 2911930 | 6/2007 |
| CN | 200986871 | 12/2007 |

OTHER PUBLICATIONS

Elecom, Pantograph Type, pp. 1-4 downloaded on Nov. 4, 2009 at URL: http://www2.elecom.co.jp/peripheral/full-keyboard/tk-fcp011/index.asp.

(Continued)

*Primary Examiner* — Jill Culler
(74) *Attorney, Agent, or Firm* — Kilpatrick Townsend & Stockton LLP (57) ABSTRACT

A keyboard includes a plurality of keys, and a keyframe into which the plurality of keys are assembled. Each of the keys includes: i) a plunger on which a character is printed, and ii) a keycap made of a transparent material. The keycap covers at least a portion of a top of the plunger.

7 Claims, 10 Drawing Sheets

OTHER PUBLICATIONS

"LPOS QWERTY Keyboards," Point of Sale, pp. 1-2 downloaded on Jun. 2, 2010 at URL: http://www.cherrycorp.com/english/keyboards/POS/LPOS_Qwerty/index.htm.

"RC80 Series Keyboards," Grocery, C-Store, Dollar Store and Specialty Retail, Technical Data, Copyright 2006 Cherry Electrical Products, 1 page.

"RC80 Series Keyboards RC80B, RC80BM & RC80BKM," Grocery, C-Store, Dollar Store and Specialty Retail, Product Overview, Cherry Electrical Products, 1 page URL: http://www.cherrycorp.com/english/keyboards/pdf/RC80_Datasheet.pdf.

China Intellectual Property Office office action for application CN200910221976.0 (Jun. 27, 2012).

China Intellectual Property Office office action for application CN200910221976.0 (Dec. 20, 2012).

* cited by examiner

KEYBOARD WITH ULTRA-DURABLE KEYS

CROSS-REFERENCES TO RELATED APPLICATIONS

This application claims priority to U.S. Provisional Patent Application No. 61/117,297, filed Nov. 24, 2008, titled "Keyboard with Ultra-Durable Keys," of Olivier Dumont, et al., and to U.S. Provisional Patent Application No. 61/158,036, filed Mar. 6, 2009, titled "Keyboard with Ultra-Durable Keys," of Olivier Dumont, et al., both of which are incorporated by reference herein in their entireties for all purposes.

BACKGROUND OF THE INVENTION

1. Field of the Invention

The present invention relates generally to keyboards, and more particularly relates to a durable and sturdy keyboard.

2. Description of the Related Art

The use of computers is pervasive, and is becoming increasingly common all around the world. Numerous computers, along with their accompanying peripheral devices, are used in a multi-user environment, such as Internet cafes, schools, colleges etc. Especially in multi-user environments (where the computer and accompanying peripheral devices are used by users who do not own them), the usage of peripheral devices, such as keyboards and mice, can be quite frequent and rough on the devices. As a result, peripheral devices, and in particular input devices such as keyboards are subjected to significant wear. Wear is exacerbated by specific "heavy" users, such as gamers who can damage peripheral devices, such as keyboards, very quickly.

Specific examples of damage to keyboards includes: (i) key printing is often erased partially or fully, after a very short time (e.g., only a few weeks); (ii) dust or other foreign materials (e.g., food particles, cigarette ashes, liquids, and so on) enter between the keys in the keyboard, often leading to functional failure; and (iii) key switches are destroyed after a short time (e.g., only a few weeks).

Therefore, new peripheral devices, such as new keyboards, are needed that are durable and can withstand use in multi-user environments.

BRIEF SUMMARY OF THE INVENTION

The present invention relates generally to keyboards, and more particularly relates to a durable and sturdy keyboard.

According to one embodiment of the present invention, a keyboard includes a plurality of keys; and a keyframe into which the plurality of keys are assembled. Each of the plurality of keys includes a plunger on which a character is printed, and a bezel made of a transparent material. Each bezel is configured to fit into a recess formed in a plunger at a portion of a top of the plunger at which the character is printed.

According to a specific embodiment of the keyboard, the character is tampo printed. According to an alternative specific embodiment, the character is laser printed before the bezel is assembled on the top of the plunger. The character may be laser printed after the bezel is assembled on the top of the plunger. The bezel may be push-fitted onto the recess of the plunger.

According to another embodiment of the present invention, a keyboard includes a plurality of keys; and a keyframe into which the plurality of keys are assembled. Each of the plurality of keys is covered by a transparent material. The transparent material may be placed onto each of the plurality of keys using a shrink-wrapping process.

According to another embodiment of the present invention, a method for fabricating a keyboard, which includes a top case, a bottom case, and a plurality of keys includes molding each of the plurality of keys, and assembling the keycap into the top case. The method further includes printing a character on top of each of the plurality of keys, and stamping clear hot foil on the top of each of the plurality of keys.

According to another embodiment of the present invention, a keyboard includes a plurality of keys each having a plunger, and a keyframe into which the plurality of keys are assembled by inserting the plurality of plungers into the keyframe. The keyboard further includes a flexible membrane attached to each of a subset of the plurality of keys to prevent foreign materials from entering the keyboard from in-between the plurality of keys. The flexible membrane may be attached to the plunger of each of the subset of the plurality of keys. Each of the plurality of keys may further include a keycap. According to a specific embodiment of the keyboard, the plurality of keycaps is transparent, and the flexible membrane is attached to the keycap of each of the subset of the plurality of keys.

According to another embodiment of the present invention, a keyboard includes a top case including a keyframe with a plurality of keys fitted into the keyframe; and a bottom case removably coupled to the top case. The bottom case includes a processor. The top case is replaceable via removing the top case from the bottom case.

According to another embodiment of the present invention, a keyboard includes a plurality of keys; and a keyframe into which the plurality of keys are assembled. Each of the plurality of keys includes a plunger, and a bezel disposed in a recess formed in a top portion of the plunger with an adhesive. The bezel has a character printed on a side which attaches to the plunger.

According to another embodiment of the present invention, a keyboard includes a plurality of keys; and a keyframe into which the plurality of keys are assembled. Each of the plurality of keys includes a plunger on which a character is printed; and a keycap made of a transparent material. The keycap covers at least a portion of a top of the plunger.

According to a specific embodiment of the keyboard, the character is tampo printed. According to another specific embodiment, the character is laser printed before the keycap is assembled on the top of the plunger. The character may be laser printed after the keycap is assembled on the top of the plunger. The keycap may be push-fitted onto the top of the plunger. The keycap may be clipped onto the top of the plunger. According to another specific embodiment, the keycap covers an entire top of the plunger and a plurality of sides of the plunger. Alternatively, the keycap covers a partial portion of the top of the plunger. The keycap covers an entirety of the top of the plunger, but not any side of the plunger.

These and other embodiments of the present invention are described in more detail in conjunction with the text below and the attached figures.

DETAILED DESCRIPTION OF THE INVENTION

Keyboards in accordance with various embodiments of the present invention have improved printing durability, reduced penetration by foreign materials inside the keyboards, and increased key switch life.

Reduce Print Wear-Off

One aspect of the present invention relates to making the printing on keyboard keys stay without wearing off. In one embodiment, this is accomplished by not having the user's fingers touch the printing directly, as on conventional keyboards, but rather providing a protective covering between the printing and the part of the key that is contacted by the user's fingers. The protective covering may be transparent or translucent, so that the user can see the printing on the key through the protective coating. A keyboard as referred to herein may include nearly any type of keyboard for nearly any type of device, which includes a keyboard. According to one embodiment, a keyboard as referred to herein is a computer keyboard for use with a computer, such as a desktop computer, a laptop computer, or the like.

Figure 1A:
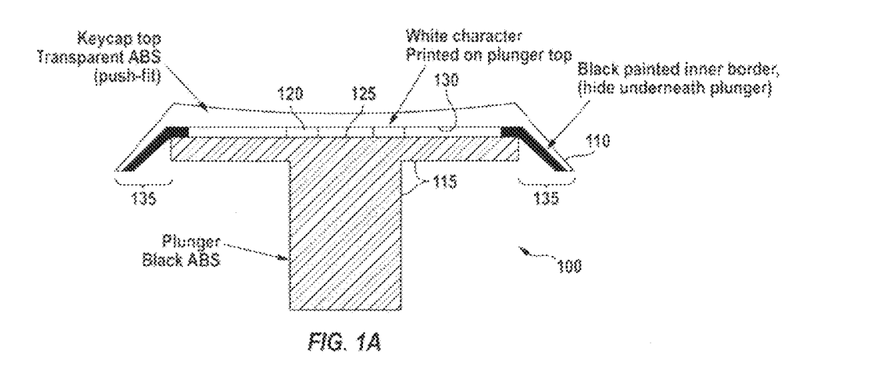
FIG. 1A is a simplified schematic of key for a keyboard where the keys include a keycap and a plunger according to one embodiment of the present invention.
Figure 1B:
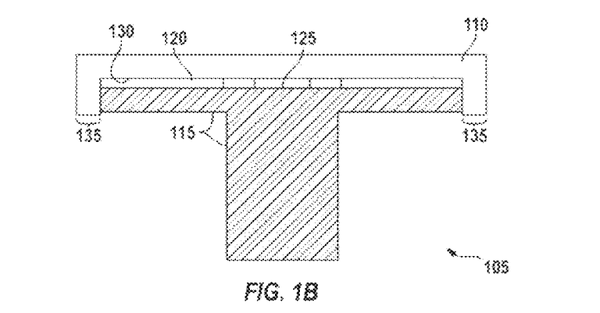
FIG. 1B is a simplified schematic of key for a keyboard where the keys include a keycap and a plunger according to another embodiment of the present invention.

In one embodiment of the present invention, a key for a keyboard includes two parts: a plunger and a keycap (e.g., a lid, a cover, a bezel, or a lens). FIGS. 1A and 1B are simplified schematics of keys 100 and 105, respectively, for a keyboard where the keys include a keycap 110 and a plunger 115. In one embodiment, one or more characters are printed as a print layer 120 on a top portion 125 of plunger 115. It is noted that the same numeral scheme is used throughout the specification and figures to identify the same or substantially the same features for different key embodiments.

According to one embodiment, plunger 115 is coupled to a key-frame assembly (not shown) of the keyboard. A key-frame assembly is typically an upper portion of a keyboard and is configured to hold the keys. A key-frame assembly may include a plurality of seats (not shown) where each seat is configured to receive a plunger and provide for the substantially linear upward and downward travel of the keys. A key-frame assembly may alternatively be configured to include scissor mounts, rubber domes, or the like to couple the keys to a keyboard and/or provide for the upward and downward travel of the keys.

According to one embodiment, keycap 110 is transparent or translucent and is configured to be assembled to plunger 115 to protect print layer 120. That is, print layer 120 is protected from being touched by a user's finger or the like because a user's finger is prevented by keycap 100 from touching the print layer. More specifically, the print layer may be sandwiched between keycap 110 and plunger 115.

According to one embodiment, print layer 120 may be in a contrasting color compared to top portion 125 of plunger 115. For example, if the top portion of the plunger is black, the print layer may be white. Alternatively, if the top portion of the plunger is white, the print layer may be black. The print layer might be applied to the entire surface of the top portion of the plunger and may be etched (e.g., laser etched) to form one or more characters in the print layer. The one or more characters may be any of the type of characters found on a conventional keyboard.

According to one embodiment, print layer 120 includes a first paint layer and a second paint layer. The first and the second paint layers may be contrasting colors. For example, the first paint layer may be white and may be applied directly on top portion 125 of the plunger, and the second paint layer may be black and may be applied over the first paint layer. The second paint layer may be etched (e.g., laser etched) to form one or more characters in the second paint layer. The etched character in the second paint layer exposes the contrasting color of the first paint layer so that the character will be relatively easy to see through the keycap.

According to one alternative embodiment, at least a portion of print layer 120 is formed on an under side 130 of the keycap. For example, a first paint layer may be formed on under side 130 of the keycap, and a second paint layer may be formed on the top portion 125 of the plunger. Alternatively, both the first and the second paint layers may be formed on under side 130 of the keycap. According to another alternative, only one paint layer may be formed on the under side of the keycap, if, for example, the top portion of the plunger is a contrasting color (e.g., white) compared to the color (e.g., black) of the paint layer.

In one embodiment, print layer 120 is tampo printed onto the keycap and/or the plunger. In another embodiment, a character forming print layer 120 is laser printed onto the keycap or the plunger. Laser printing may make localization of the printing easier. Localization is discussed in further detail below. In some embodiments, some additional elements (described in further detail below), such as UV coating, are also included in a key. In one embodiment, the UV coating is tampo printed.

According to one embodiment, a keyboard may be formed in part by molding the plunger, assembling the plunger into the key-frame assembly of the keyboard, printing a character (e.g., in white or black) on the top portion of the plunger, molding the transparent keycap, and assembling the transparent keycap on the plunger.

According to one embodiment, the keycap of key 100 has a beveled shape at sides 135 of the keycap. The undersides of the bevel may be black (e.g., painted black, printed black, etc.) to inhibit viewing of the plunger. FIG. 1B shows a variation of the above-described embodiment where the shape of the keycap is different from the shape of the keycap shown in FIG. 1A. In the embodiment shown in FIG. 1B, the plunger is not hidden by the keycap as the sides 135 of the keycap have a lesser sideways and downward extent.

In one embodiment, the keycap is configured to "push-fit" onto the plunger to couple keycap thereto. The keycap or the plunger may include various mechanical features so that the keycap may couple to the plunger if the keycap is push-fit onto the plunger. In another embodiment, the keycap may be coupled to the plunger by ultra-sonic welding, glue, etc.

Figure 1C:
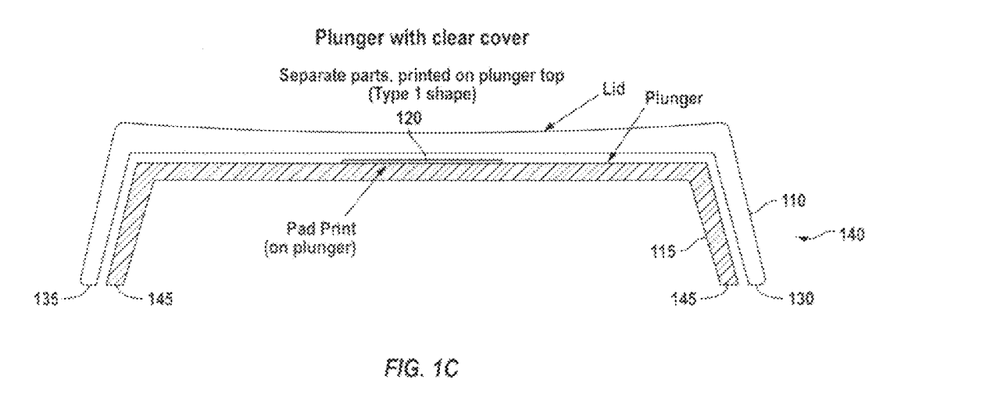
FIG. 1C is a simplified schematic of key for a keyboard where the keys include a keycap and a plunger according to another embodiment of the present invention.

FIG. 1C is a simplified schematic of a key 140 according to another embodiment of the present invention. Key 140 includes keycap 110 coupled to plunger 115. Print layer 120 is on the plunger and the keycap (e.g., transparent keycap) covers the print layer. Plunger 115 may have a downwardly extending stem (not shown) or the like that is configured to couple to a base plate or the like of the keyboard. Alternatively, plunger 115 may be coupled to a scissor mount or the like for guiding the key up and down. The keycap and plunger of key 140 might have shapes that are different from keycaps and plunger shown in FIGS. 1A and 1B. For example, the sides 135 of the keycap and the sides 145 of the plunger might both be beveled.

Figure 1D:
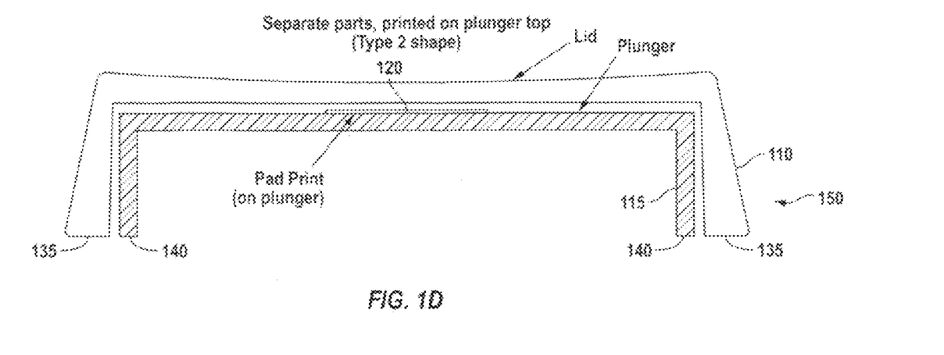
FIG. 1D is a simplified schematic of key for a keyboard where the keys include a keycap and a plunger according to another embodiment of the present invention.

FIG. 1D is a simplified schematic of a key 150 according to another embodiment of the present invention. Similar to key 150, print layer 120 is on the plunger and a transparent keycap covers the print layer. The plunger of key 150 may have a downwardly extending stem (not shown) or the like that is configured to couple to a base plate or the like of the keyboard. The keycap and plunger of key 140 might have shapes that are different from keycaps and plungers discussed above. For example, the sides 135 of the keycap may have a beveled outer portion and an inner portion that extends substantially straight downward. The sides 145 of the plunger may similarly extend substantially straight downward.

Figure 1E:
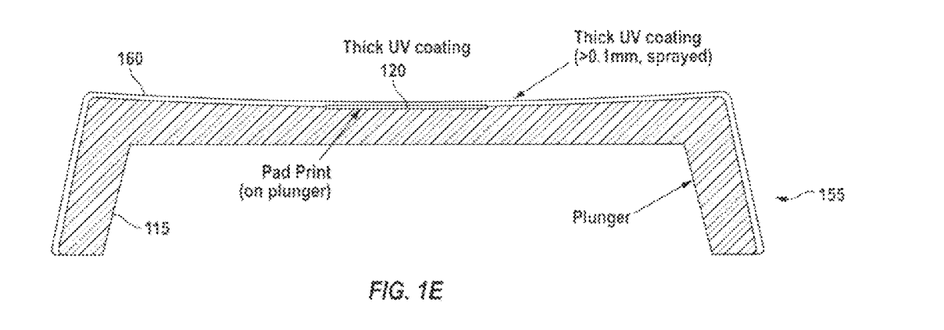
FIG. 1E is a simplified schematic of a key according to another embodiment of the present invention.

FIG. 1E is a simplified schematic of a key 155 according to another embodiment of the present invention. Key 155 includes a plunger 115 and a coating 160 over print layer 120 and the plunger. The coating may be configured to inhibit ultra-violet (UV) radiation from reaching the print layer. The coating may be about 0.1 millimeters thick or thicker. The coating may be applied by a spray technique.

In one embodiment, the print layer 120 is laser printed onto the plunger through the transparent cap. This allows for easier localization. Localization is important if keyboards used in different places have different keyboard layouts (e.g., because of different languages used in different countries, etc.). That is, the characters to be printed in the print layer on the various keys are different, based upon factors such as where the keyboard will be used and/or sold. In such a situation, keyboards which already have characters printed on them during initial manufacture/assembly, and which are initially meant to be used in a certain geographic place, generally are not re-assigned to be used/sold in a different geographic place (e.g., due to a change in the demand or supply etc.), since the "wrong" characters are pre-printed on them. One solution to this problem is to not print the characters on the keys at the place and time of initial manufacture (e.g., in China), but rather to print the characters onto the keys at a later time and/or at a different place (e.g., locally in Europe). This manufacturing approach provides significant flexibility in supply chain management. Being able to print the character in the print layer through the transparent keycap makes the process much easier and cheaper for local printing. In accordance with some embodiments of the present invention, there is no need to disassemble and/or assemble the transparent cap in order to print the characters.

In accordance with another embodiment of the present invention, a method similar to a shrink wrapping method used to apply shrink wrap is used to apply a transparent film onto the top of a set of keys. A transparent foil or transparent film is positioned to cover the tops of the keycaps of the keys. The transparent foil or transparent film is treated (e.g., by ionizing rays) so that the transparent foil or transparent film shrinks when heated with a heat gun. This makes it possible to apply the transparent foil or transparent film on non-flat surfaces (e.g., non-flat keys). In one embodiment, a relatively thin transparent adhesive/glue layer is applied on a side of the transparent foil or transparent film that makes contact with the tops of the keycaps to make the adhesion of the transparent foil or transparent film to the keys permanent.

In accordance with another embodiment, hot foil stamping method is used to protect the print layer on the keycaps. The method includes, in one embodiment, molding the keycaps, assembling the keycaps into the top case on the plungers, printing the characters in the print layer (e.g., by tampo printing in white print), and stamping clear hot foil on the tops of the keycaps. One advantage of this technology is that it may be applied to all the keys on the keyboard at one time. In one embodiment, a preformed silicon sheet is added on the top of the keyframe, instead of the hot foil. One advantage of this method include the fact that silicon sheets can be easily washed and cleaned, and that dust-proofing of the keys will also result. Dust-proofing is discussed further later in the application. In one embodiment, a UV coating is put on the keycaps instead. As with the hot foil stamping, one of the advantages is that the UV coating can be applied to the entire keyboard in one step.

In accordance with still another embodiment, double injection technology is used to protect the print on the keycaps. The process includes, in one embodiment, molding the keycap, putting the keycap on a printing frame, printing a character in the print layer (e.g., by tampo printing in white print), removing the keycap from the printing frame, putting the keycap in the tooling, molding a clear plastic on the top, and assembling the keycap in the keyframe of a keyboard. In other embodiments, laser printing or reductor technology may be used instead of tampo printing to apply print layer 120 to the keys. Advantages of these technologies include very long-lasting printing, as well as aesthetic appeal.

In one embodiment, a character is engraved into the keycap. The keycap is molded and then assembled into the keyframe of a keyboard. The engraving will last for a relatively long time, and will be low-cost. In one embodiment, the grooves that form the character may be tampo printed. Further, in one embodiment, a UV coating is tampo printed into the grooves. With an adequate quantity of UV coating, it is possible to fill-in the engraved grooves.

In yet another embodiment, Pictaflex technology developed by ICI Imagedata of Europe may be used for the print layer to form characters in the print layer. Various different designs can be easily created, and the characters will be abrasion-resistant.

Figure 2A:
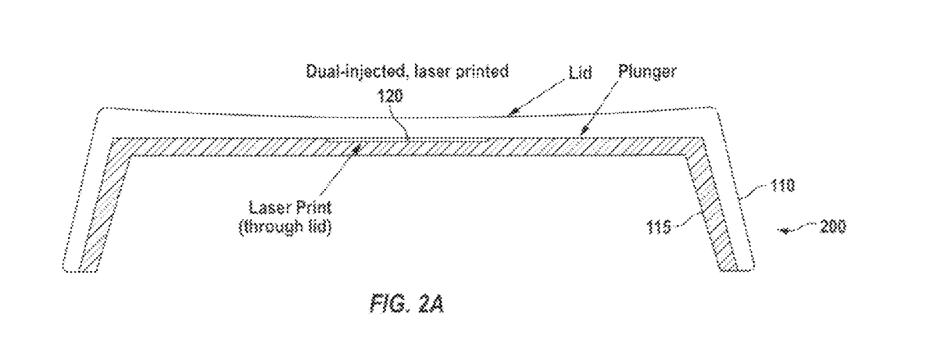
FIG. 2A is a simplified schematic of a key having a keycap covering the top and side portions of a plunger.
Figure 2B:
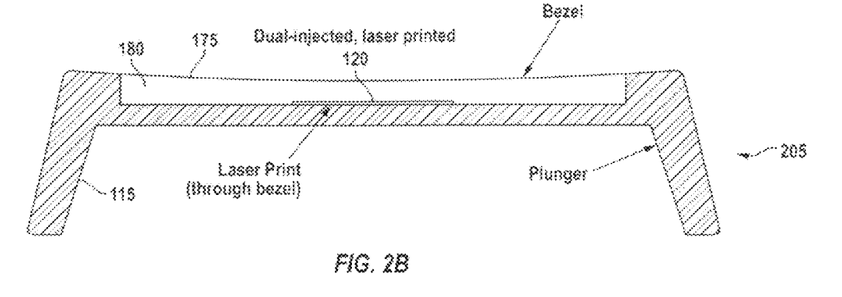
FIG. 2B is a simplified schematic of a key that includes a transparent or translucent bezel disposed in an opening formed in a plunger.
Figure 2C:
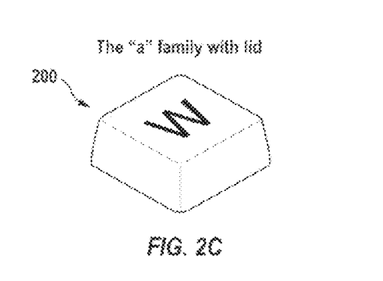
FIG. 2C is a top-view of key according to one embodiment.
Figure 2D:
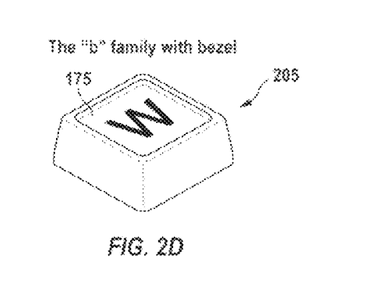
FIG. 2D is a top-view of key having a bezel.

Various specific implementations in accordance with some embodiments are possible. Examples of two families of key types in accordance with the embodiments of the present invention can be seen in FIGS. 2A-2C. FIG. 2A is a simplified schematic of a key 200. Key 200 includes keycap 110, which covers the top and side portions of plunger 115. The key may be formed from a dual-injection molding process where the keycap may first be molded and then the plunger may be molded onto the keycap, or the plunger may first be molded and the keycap may be molded onto the plunger. Print layer 120 may be formed on the keycap or the plunger between the two molding steps. FIG. 2B is a simplified schematic of a key 205 according to another embodiment of the present invention. Key 205 includes a transparent or translucent bezel 175, which may be disposed in an opening 180 formed in the plunger. Bezel 175 may cover print layer 120 formed between the bezel and the plunger. The bezel and plunger may be formed in dual-injection molding process. FIG. 2C shows a top-view of key 200, and FIG. 2D shows a top-view of key 205 with bezel 175.

In accordance with an aspect of the present invention, improvements include (i) reducing glare from the edges of the keys; and (ii) improving the readability of the characters printed on the keys. In one embodiment, the glare from the edges of the keys is reduced by removing the air between the transparent keycap and the plunger. Removing the air gap and the glare generally provides a key that is darker, that is esthetically pleasing to look at, and is more comfortable to look at. In one embodiment, readability of characters is improved by printing the character on the under side of the keycap. Such printing reduces the number of optical interfaces that lie between the character and the eye. Optical interfaces include the character to air interface, the air to keycap interface, etc.

Figure 3A:
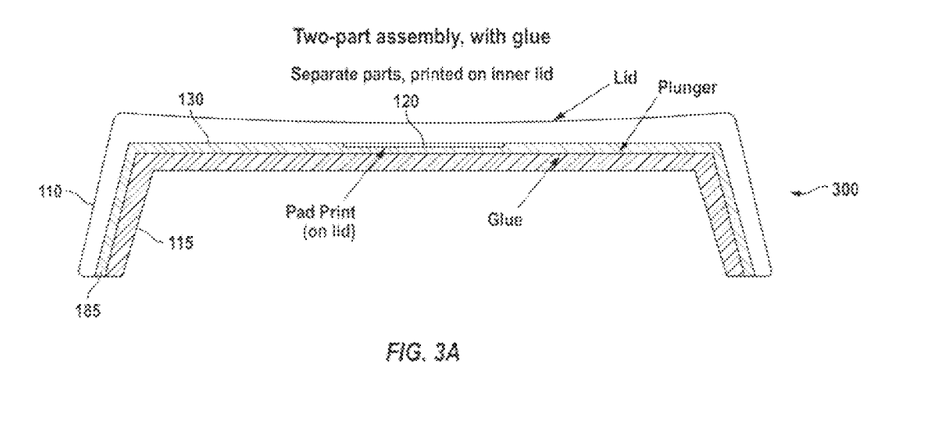
FIG. 3A is simplified schematic of a key having a character formed on an under side of a keycap.
Figure 3B:
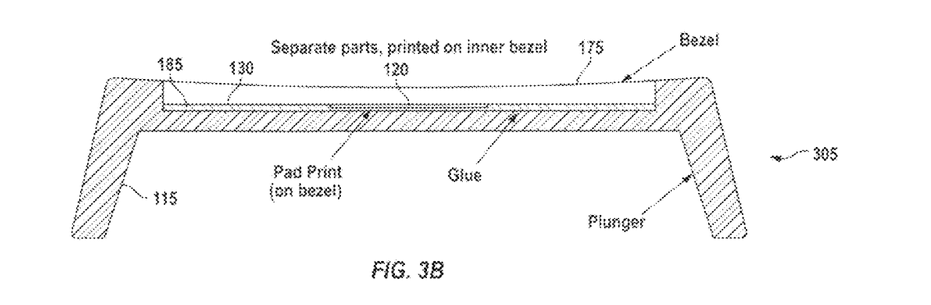
FIG. 3B is a simplified schematic of a key having translucent bezel.
Figure 3C:
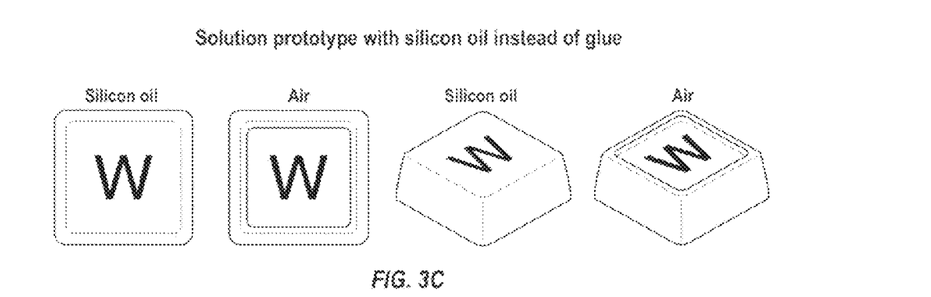
FIG. 3C is a simplified top view of keys with silicon oil instead of glue between the keycap and the plunger.
Figure 3D:
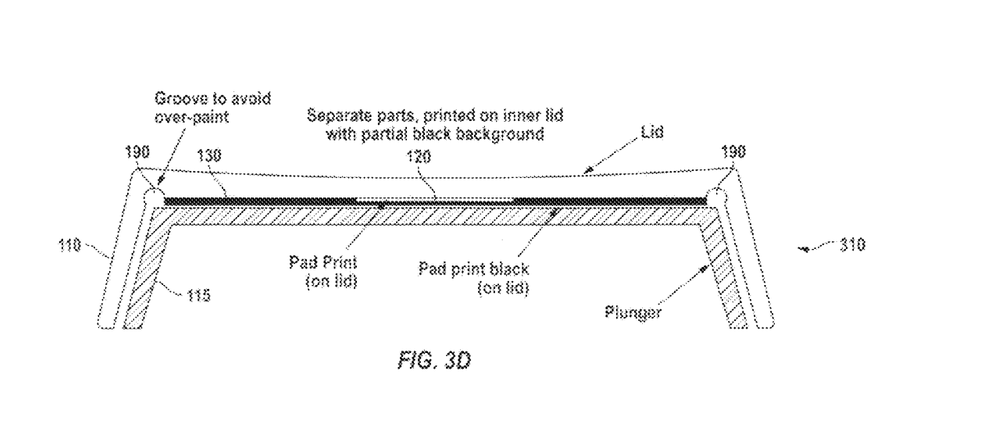
FIG. 3D is a simplified schematic of a key having a keycap with a print layer on the under side of the keycap.

The keycap features described above may be seen in the keys shown in FIGS. 3A-3D and 4A-4C. In particular, FIGS. 3A-3D are simplified schematics of keys having a two part assembly put together with adhesive. FIG. 3A is a simplified schematic of a key 300 according to one specific embodiment. Key 300 includes print layer 120 with a character formed therein on under side 130 of keycap 110. A glue layer 185 may couple the keycap to the plunger. FIG. 3B is a simplified schematic of a key 305 having translucent bezel 175 glued by glue layer 185 to the plunger. Print layer 120 may be formed on the under side 130 of the bezel. FIG. 3C includes simplified top views of keys with silicon oil instead of glue between the keycap and the plunger. FIG. 3C illustrates the visual differences between keys with an air gap and without an air gap (silicon oil) between the keycap and the plunger. FIG. 3D is a simplified schematic of a key 310 having a keycap and a plunger. In this embodiment, print layer 120 is formed on the under side 130 of the keycap. In one embodiment, the print layer has a partial black background. A groove 190 may be formed in the keycap to prevent the paint from being non-uniform at the inside edges of the keycap. Groove 190 may be formed in the keycap after print layer 120 is formed on under side 130.

Figure 4A:
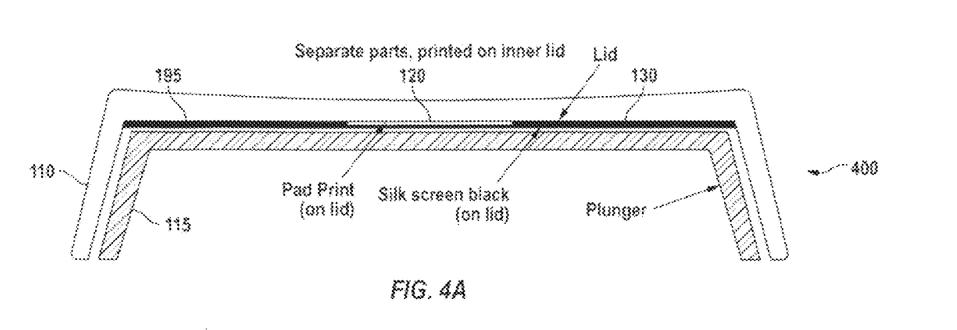
FIG. 4A is a simplified schematic of a key having a two-part assembly with a black silk screen layer and print layer where both layers are formed on an under side of a keycap.
Figure 4B:
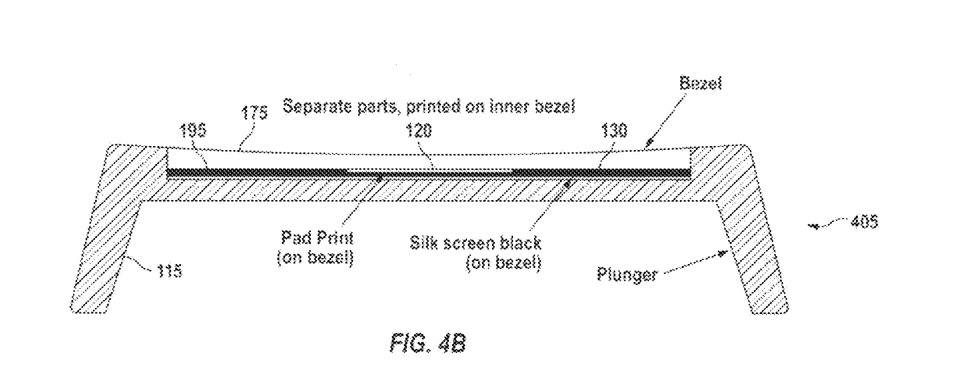
FIG. 4B is a simplified schematic of a key having a two-part assembly with a black silk screen layer and a print layer both formed on an under side of a bezel.

FIG. 4A is a simplified schematic of a key 400 having a two-part assembly with a black silk screen layer 195 and print layer 120 where both layers are formed on under side 130 of keycap 110. FIG. 4B is a simplified schematic of a key 405 having a two-part assembly with a black silk screen layer 195 and print layer 120 where both layers are formed on under side 130 of bezel 175. For both key 400 and key 405, the silk screen layer 195 may be formed on the under side of the keycap and may be formed to cover print layer 120.

Figure 4C:
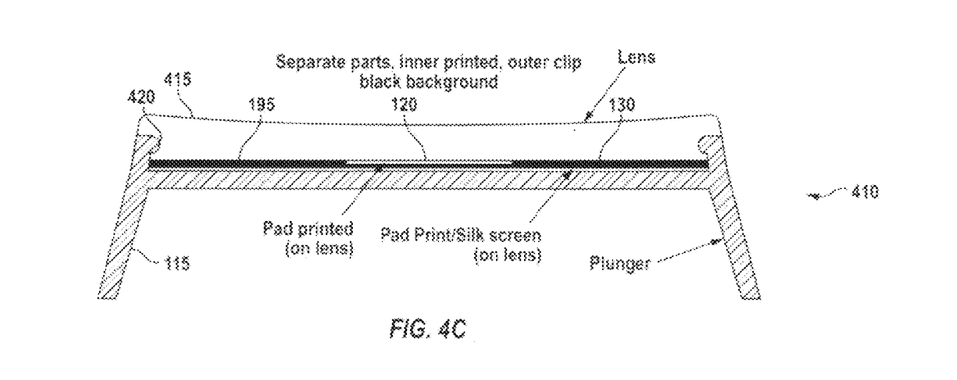
FIG. 4C is a simplified schematic of a key having a lens coupled to a plunger.
Figure 4D:
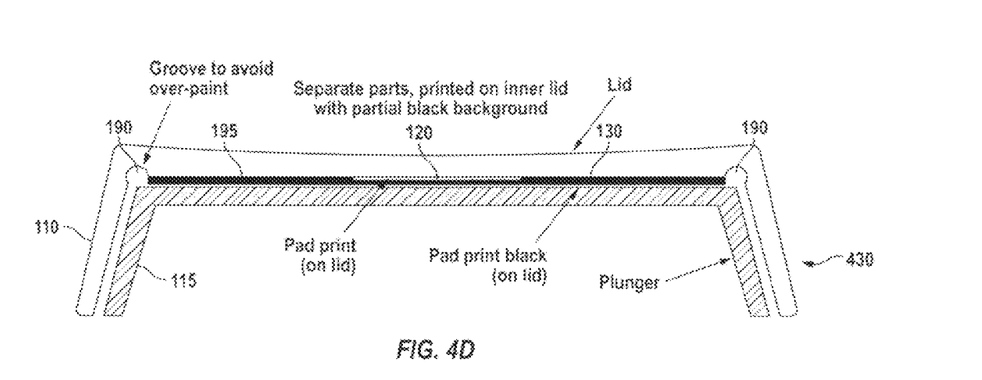
FIG. 4D is a simplified schematic of a key having a groove formed at the sides of a black silk screen layer.

FIG. 4C is a simplified schematic of a key 410 according to another embodiment of the present invention. Key 410 includes a lens 415 coupled to plunger 115. A lens as referred to herein is a top cover of a key that covers the entire top portion of the plunger. A lens differs from a bezel in that a bezel only covers a portion of the top of the plunger. Further, a lens differs from a keycap in that a keycap may cover the sides of a plunger. According to one embodiment, lens 415 is attached to the plunger via a clip 420. In this embodiment, clip 420 is integrally formed with the plunger. However, in other embodiments, the clip is a discrete component. Other technologies may be used to attach the lens to the plunger. Black silk screen layer 195 and print layer 120 may be formed on an under side 130 of lens 415. FIG. 4D is a simplified schematic of a key 430 where groove 190 is formed at the sides of black silk screen layer 195. While layer 195 is referred to as a black silk screen layer, layer 195 may be a pad print black layer.

Figure 4E:
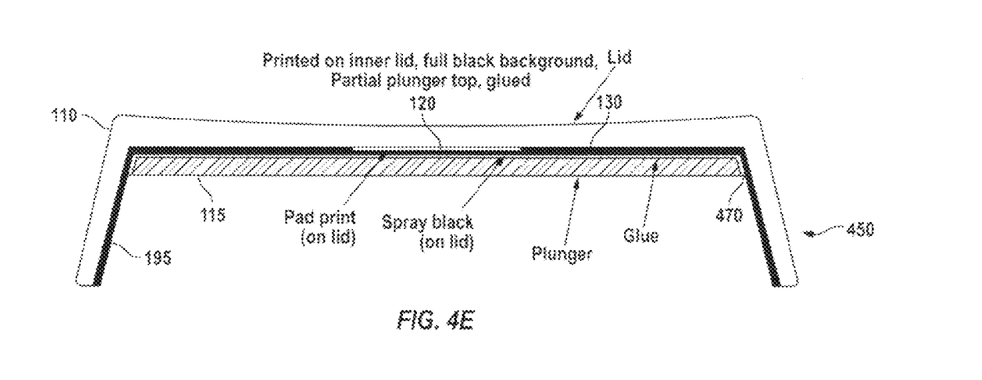
FIG. 4E is a simplified schematic of a key according to another embodiment of the present invention.
Figure 4F:
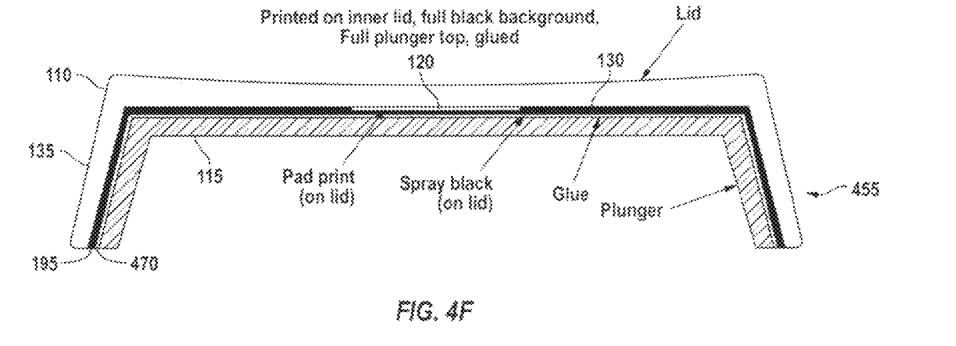
FIG. 4F is a simplified schematic of a key according to another embodiment of the present invention.
Figure 4G:
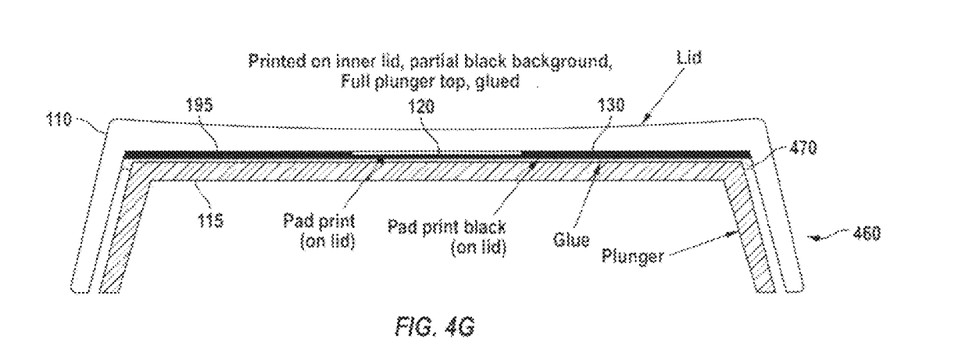
FIG. 4G is a simplified schematic of a key according to another embodiment of the present invention.

FIGS. 4E-4G are respective simplified schematics of keys 450, 455, and 460 according to various embodiments of the present invention. Keys 450, 455, and 460 are substantially similar to keys 400, 405, and 410, respectively, except that each of keys 450, 455, and 460 includes a glue layer 470, which is configured to couple the keycaps of the plungers of these keys. Glue layer 470 is hidden by the black silk screen layer 195 (or alternatively a black paint layer). The black silk screen layer is configured to block from view any air bubbles that might form in the glue layer providing for an esthetically pleasing appearance of these keys. According to one embodiment, the black silk screen layer may extend down the sides 135 of the keycaps so that the plunger is not visible through the keycap. Because the plunger is not visible through the keycap, the shape of the plunger may be adjusted as needed. That is, the plunger might not extend by the same amount as the keycap to provide an esthetically pleasing looking key. For instance, the sides of the plunger may be removed altogether while the key maintains a substantially uniform black appearance. As a result of the ability to modify the shape/geometry of the plunger, the plunger can be made significantly smaller, thus allowing for smaller keys. FIGS. 4E and 4F show key embodiments with the character printed on the under side of the keycap along with a full black background. FIG. 4E shows a key embodiment with a partial plunger (having no sides), whereas FIG. 4F shows a key embodiment with a full plunger. FIG. 4G shows a key embodiment with the character printed on the under side of the keycap. The key may includes a full plunger and the keycap may have a partial black background. That is, the sides of the keycap are not painted black.

Figure 5A:
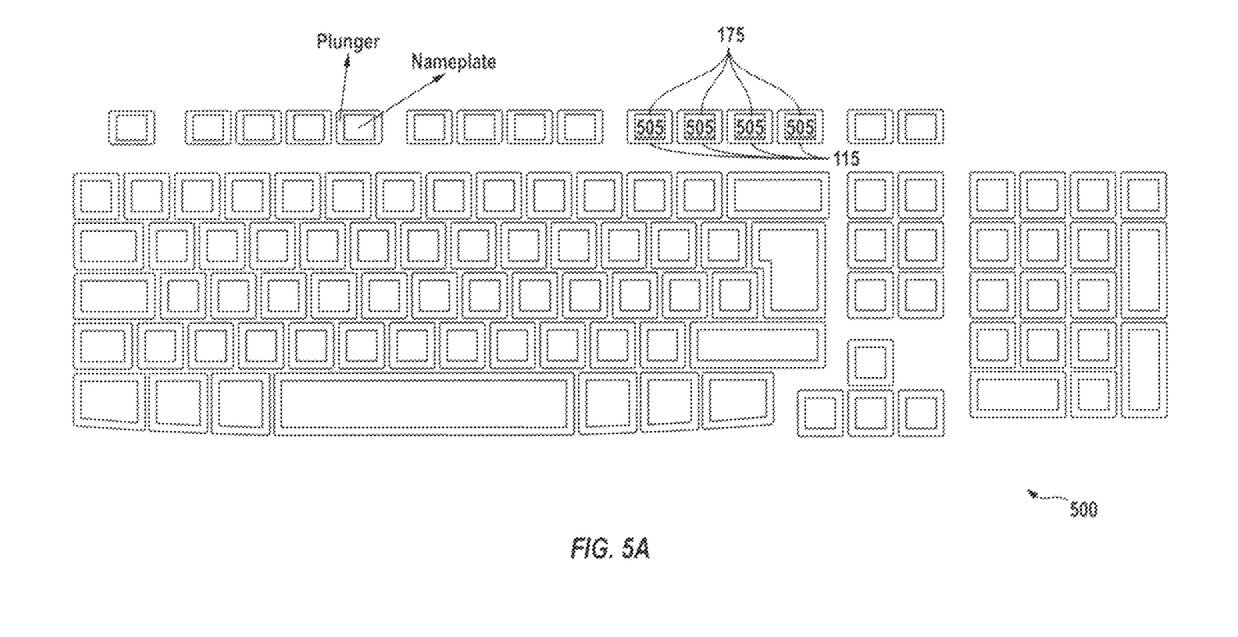
FIG. 5A is a simplified schematic of a keyboard including a plurality of keys according to one embodiment of the present invention.

FIG. 5A is a simplified schematic of a keyboard 500 including a plurality of keys 505 according to one embodiment of the present invention. Keys 505 may be any of the keys described above that include a bezel 175 coupled to a plunger 115, for example by a glue layer.

Figure 5B:
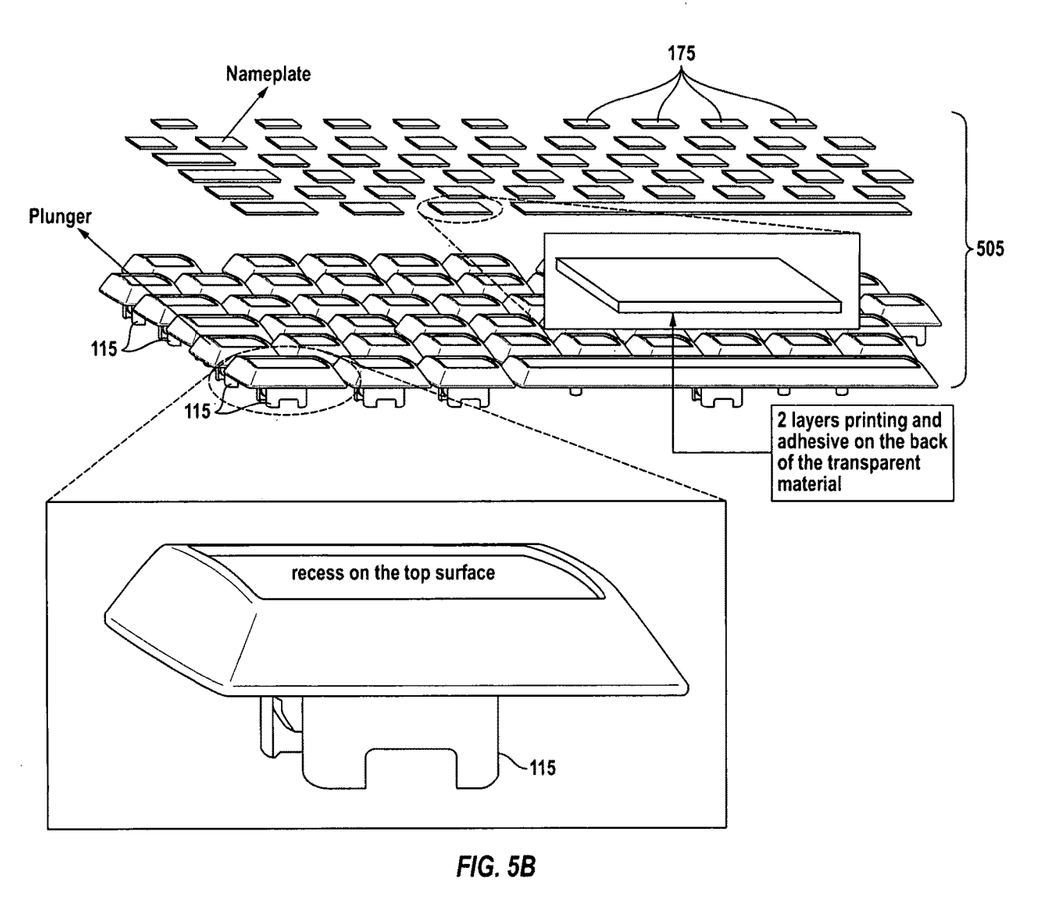
FIG. 5B is an exploded view of the plurality of keys with bezels.

FIG. 5B is an exploded view of the plurality of keys 505 with the bezels 175 separated from the plungers 115. Each bezel may include a print layer formed on the under surface. According to one embodiment of the present invention, a process for manufacturing keyboard 500 may include the following steps. The plungers may be assembled to a keyframe of the keyboard. For the bezels, the characters in the print layer 120 and the background color may be printed onto the under side of the bezels. An adhesive may be applied to the under side of the bezels. The outline of each key/bezel may be punched out. Thereafter, each bezel is coupled to the plungers on the keyframe. This final assembly can take place either in a single step or key by key. It is to be noted that many of the above-described technologies/processes may be combined with, and/or be used in conjunction with, each other, and be used with different printing processes.

Improve Key Guiding and Reduced Key Wear

One aspect of the present invention relates to improved guiding of the keys as the keys move upward and downward and relates to reduced wear of the keys during upward and downward travel. For a keyboard in accordance with one embodiment of the present invention, the key height is increased as compared to traditional key, so as to increase the guiding length. In another embodiment, a silicon-loaded plastic bush (douille) is push-fitted (or fitted in some other appropriate way) to reduce friction. In another embodiment, the plungers of the keys are silicon loaded.

Reduce Dust Penetration Inside the Keyboard

One aspect of the present invention relates to reducing the penetration of foreign materials (e.g., dust, food particles, liquids, cigarette ashes, and so on) into a keyboard.

In a keyboard in accordance with one embodiment of the present invention, a silicon membrane is positioned between the keys and the keyframe (plunger guide) to prevent foreign material from entering the keyboard from in-between the keys. One of the purposes of the membrane is to prevent foreign material from entering the "guiding" mechanism of the key. Further, any foreign material to which the keyboard is exposed stays on top of the membrane, thus allowing it to be removed/taken out (e.g., washed, air sprayed) easily.

Figure 6:
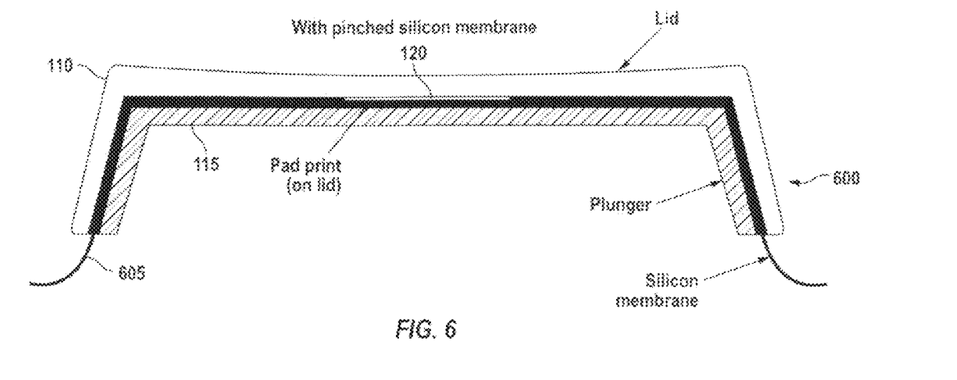
FIG. 6 is a simplified schematic of a key coupled to membrane according to one specific embodiment of the present invention.

FIG. 6 is a simplified schematic of a key 600 coupled to membrane 605 according to one specific embodiment of the present invention. Membrane 605 is pinched between the keycap and plunger during assembly of the key. According to one embodiment, membrane 605 is continuous without any holes formed therein. According to an alternative embodiment, the membrane has a plurality of holes formed therein where the positions of the holes correspond to the key locations. During assembly, that membrane seals each plunger of each key like an o-ring to inhibit foreign material from entering into the body of a keyboard.

Figure 7A:
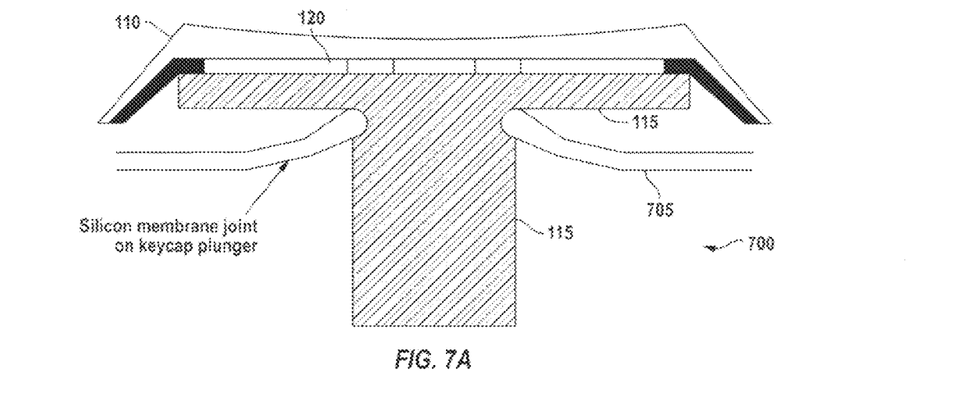
FIG. 7A is a simplified schematic of a key having a membrane coupled to a plunger of a key.
Figure 7B:
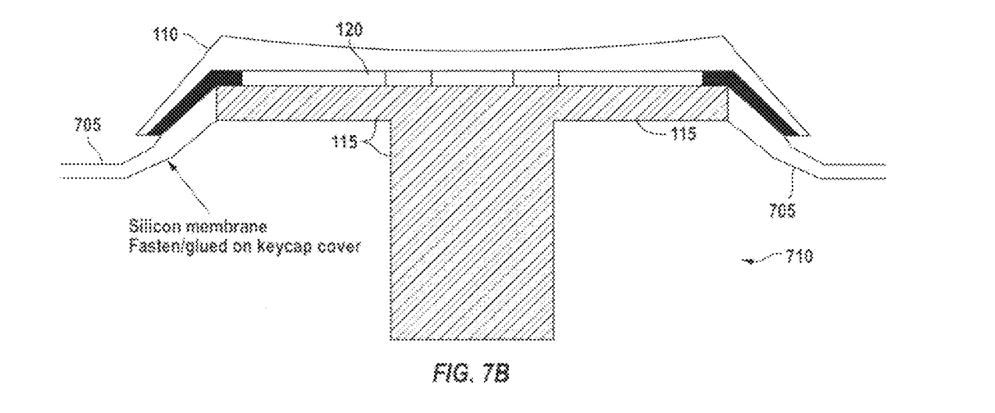
FIG. 7B is a simplified schematic of a key having a membrane coupled between a keycap and a plunger.

FIG. 7A is a simplified schematic of a key 700 having a membrane 705 coupled to the plunger 115 of the key. Membrane 705 may be coupled to the plunger via a ring joint configuration. FIG. 7B is a simplified schematic of a key 710 according to another embodiment of the present invention. FIG. 7B shows membrane 705 coupled to the keycap and/or the plunger.

In one embodiment, membrane 705 covers the whole "uncovered" surface of the keyboard, and makes the keyboard (and its bottom part) almost dustproof and spill-proof. In one embodiment, the membrane 705 is specially designed and treated as it becomes visible when removing the top case. In one embodiment, the membrane extends and is sealed with the bottom case to provide an improved spill-proof and dust-proof feature.

A keyboard in accordance with an embodiment of the present invention includes an easy to change keyframe. For example, such a keyframe may clip in to the keyboard.

Replacement keyframes are provided, in accordance with an embodiment of the present invention, so that the entire keyboard does not need to be replaced when it malfunctions, but rather the keyframe can be simply and easily replaced. This would lead to a cost-saving for the users/owners of the keyboards, since such a "maintenance" cost is less costly than replacing the entire keyboard.

In one embodiment, the keyboard top case acts as a keyframe and holds the keys. The top case is easy to detach from the bottom case (e.g., via a set of side latches or the like). The bottom case unit of the keyboard holds the rubber sheet, membranes, electronics and cable, similar to a conventional keyboard, but the top surface of the assembly is adapted for the replacement kit.

A service for changing the keyframe is provided in accordance with an embodiment of the present invention, and in one embodiment, such a service includes recycling of the replaced parts. A dedicated warranty service may be provided to the customer for such a service. Additionally, other measures to extend the life of a keyboard may include cleaning the inside of the keyboard in addition to replacement of the worn-out components.

While particular embodiments and applications of the present invention have been illustrated and described, it is to be understood that the invention is not limited to the precise construction and components disclosed herein. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A keyboard with reduced foreign-material penetration, the keyboard comprising:
   a plurality of keys each having a plunger and a keycap;
   a keyframe into which the plurality of keys are assembled by inserting the plurality of plungers into the keyframe; and
   a flexible membrane attached to each of the plurality of keys to prevent foreign materials from entering the keyboard from in-between the plurality of keys, wherein the flexible membrane is continuous without any holes formed therein, and wherein the flexible membrane is pinched between the plunger and the keycap for each of the plurality of keys.

2. The keyboard of claim 1, wherein the plurality of keycaps are transparent.

3. A keyboard comprising:
   a keyframe;
   a plurality of keys disposed in the keyframe; and
   a flexible membrane attached to each of the plurality of keys to prevent foreign materials from entering the keyboard from in-between the plurality of keys, wherein the flexible membrane is continuous without any holes formed therein, wherein each of the plurality of keys includes a plunger and a keycap, and wherein the flexible membrane is pinched between the plunger and the keycap for each of the plurality of keys.

4. The keyboard of claim 3 wherein the flexible membrane is glued to the keycap for each of the plurality of keys.

5. The keyboard of claim 3, wherein the plurality of keycaps are transparent.

6. The keyboard of claim 3, wherein the flexible membrane is composed of silicon.

7. The keyboard of claim 3, further comprising a top case and a bottom case configured to enclose the keyframe and the plurality of keys therein, wherein the flexible membrane extends and is sealed with the bottom case.

* * * * *